(12) United States Patent
Nishihara

(10) Patent No.: US 7,280,928 B2
(45) Date of Patent: Oct. 9, 2007

(54) EXPENDABLE SUPPLIES CONTAINER CAPABLE OF MEASURING RESIDUAL AMOUNT OF EXPENDABLE SUPPLIES

(76) Inventor: Yuichi Nishihara, c/o Seiko Epson Corporation, 3-5, Owa 3-chome, Suwa-shi, Nagano-ken 392-8502 (JP)

( * ) Notice: Subject to any disclaimer, the term of this patent is extended or adjusted under 35 U.S.C. 154(b) by 339 days.

(21) Appl. No.: 10/518,528

(22) PCT Filed: Feb. 4, 2004

(86) PCT No.: PCT/JP2004/001155

§ 371 (c)(1),
(2), (4) Date: Dec. 20, 2004

(87) PCT Pub. No.: WO2004/076985

PCT Pub. Date: Sep. 10, 2004

(65) Prior Publication Data

US 2006/0036377 A1    Feb. 16, 2006

(30) Foreign Application Priority Data

Feb. 26, 2003    (JP) .............................. 2003-048571

(51) Int. Cl.
*G01F 23/00* (2006.01)
*B41J 29/393* (2006.01)
(52) U.S. Cl. ......................................... 702/55; 347/19
(58) Field of Classification Search .................. 702/50, 702/55, 64, 71; 347/6–7, 14–15, 19
See application file for complete search history.

(56) References Cited

U.S. PATENT DOCUMENTS 6,106,087 A * 8/2000 Kishi .............................. 347/7
6,517,175 B2 * 2/2003 Kanaya et al. ................. 347/7
6,938,978 B2 * 9/2005 Kosugi et al. ................ 347/19
7,155,972 B2 * 1/2007 Kosugi ...................... 73/290 V
2005/0237349 A1 * 10/2005 Nishihara ...................... 347/7

FOREIGN PATENT DOCUMENTS

| JP | 06-008427 A | 1/1994 |
| JP | 10-305590 A | 11/1998 |
| JP | 2001-147146 A | 5/2001 |
| JP | 2002-241450 A | 8/2002 |

OTHER PUBLICATIONS

International Search Report dated May 25, 2004, in PCT/JP2004/001155.

* cited by examiner

*Primary Examiner*—Eliseo Ramos-Feliciano
*Assistant Examiner*—Mary Catherine Baran

(57) ABSTRACT

This invention is an expendable container capable of measuring a residual quantity of stored expendable. The expendable container comprising an expendable tank configured to store the expendable and has a piezoelectric element attached thereto; a detection signal generation circuit configured to charge and discharge the piezoelectric element, and generate a detection signal including cycle information, the cycle information representing a cycle of an output voltage wave of the piezoelectric element after the discharge; and a control module configured to control the charge and the discharge of the piezoelectric element by the detection signal generation circuit. The detection signal generation circuit comprises: a comparator configured to compare a voltage of the output voltage wave with a reference voltage for residual quantity detection, and generate a pulse according to a result of the comparison; and a signal generator configured to generate the detection signal in response to the generated pulse. The control module is capable of varying the reference voltage for residual quantity detection.

6 Claims, 17 Drawing Sheets

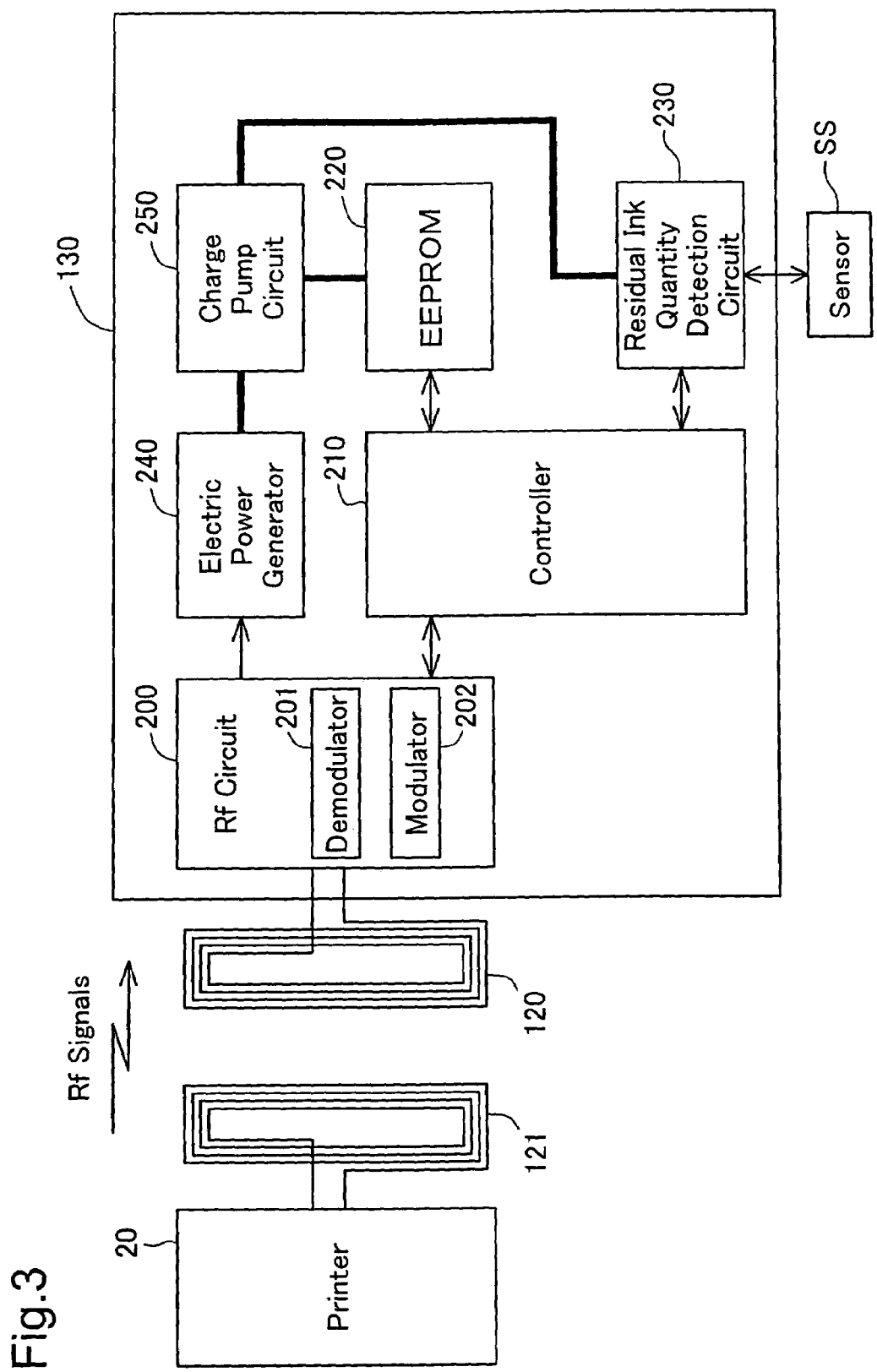

Fig.8

Sensor Ranks and Settings of Reference Voltage

| Sensor Rank | Reference Voltage |
|---|---|
| A | 4.2 |
| B | 4.1 |
| C | 3.9 |
| D | 3.7 |
| E | 3.5 |
| F | 3.4 |
| G | 3.3 |
| H | 3.2 |

Unit: V

Applied Voltage Of Piezoelectric Element
In Time Domain (Discharge Time)

Applied Voltage of Piezoelectric Element in
Frequency Domain

Vibration Voltage and Transfer Function of Sensor in Frequency Domain

Output Voltage of Sensor in Frequency Domain

Vibration Voltage And Transfer Function of
Sensor in Frequency Domain
(Before Regulation)

Output Voltage of Sensor in Frequency Domain

Applied Voltage of Piezoelectric Element in Time Domain
(Discharge Time)

Applied Voltage of Piezoelectric Element in Time Domain
(Discharge Time)

Fig.15

Sensor Ranks And Settings Of Reference Voltage

| Sensor Rank | Reference Voltage For Function Check | Reference Voltage For Residual Quantity Detection |
|---|---|---|
| A | 2.9 | 4.2 |
| B | 2.9 | 4.1 |
| C | 2.8 | 3.9 |
| D | 2.8 | 3.7 |
| E | 2.8 | 3.5 |
| F | 2.7 | 3.4 |
| G | 2.7 | 3.3 |
| H | 2.7 | 3.2 |

Unit: V

EXPENDABLE SUPPLIES CONTAINER CAPABLE OF MEASURING RESIDUAL AMOUNT OF EXPENDABLE SUPPLIES

TECHNICAL FIELD

The present invention relates to a technique of manufacturing an expendable container with a function of measuring a residual quantity of an expendable kept therein.

BACKGROUND ART

Inkjet printers have widely been used as the output device of the computer. Ink as an expendable for the inkjet printer is generally kept in an ink cartridge. One proposed method of measuring the residual quantity of ink kept in the ink cartridge utilizes a piezoelectric element to attain direct measurement, as disclosed in Japanese Patent Laid-Open Gazette No. 2001-147146.

This proposed method first applies a voltage wave to the piezoelectric element attached to the ink cartridge to vibrate a vibrating element of the piezoelectric element. The method then detects a variation in cycle of counter electromotive force, which is caused by remaining vibration in the vibrating element of the piezoelectric element, to measure the residual quantity of the expendable.

This prior art method, however, has a drawback that unintentional vibration noise lower an S/N ratio to interfere with accurate measurement. A great work load has been applied to manually adjust the circuit settings of individual ink cartridges for an increase in S/N ratio. This problem is not restricted to the ink cartridges but is commonly found in any expendable containers having a function of utilizing a piezoelectric element to measure the residual quantity of an expendable kept therein.

DISCLOSURE OF THE INVENTION

The object of the invention is thus to eliminate the drawbacks of the prior art technique and to provide a technique of restricting noise in an expendable container having a function of utilizing a piezoelectric element to measure a residual quantity of an expendable kept therein.

The first application of the invention is an expendable container capable of measuring a residual quantity of stored expendable. The expendable container comprises an expendable tank configured to store the expendable and has a piezoelectric element attached thereto, a detection signal generation circuit configured to charge and discharge the piezoelectric element and generate a detection signal including cycle information, cycle information representing a cycle of an output voltage wave of the piezoelectric element after the discharge and a control module configured to control the charge and the discharge of the piezoelectric element by the detection signal generation circuit. The detection signal generation circuit comprises a comparator configured to compare a voltage of the output voltage wave with a reference voltage for residual quantity detection, and generate a pulse according to a result of the comparison, and a signal generator configured to generate the detection signal in response to the generated pulse. The control module is capable of varying the reference voltage for residual quantity detection.

The first application of the invention is the expendable container that enables extraction of only a signal higher than the reference voltage for residual quantity detection from a voltage wave due to free vibration of the piezoelectric element after discharge. The reference voltage is variable, and adequate setting of the reference voltage for noise reduction desirably enhances the reliability of the measurement. The measurement is carried out to provide the cycle information, which is used to determine whether the residual quantity of the expendable is greater than the preset level. Here the piezoelectric element has two characteristics, inverse piezoelectric effect of deformation by charge or discharge and piezoelectric effect of generation of voltage due to deformation.

The second application of the invention is an expendable container capable of measuring a residual quantity of stored expendable The expendable container comprises an expendable tank configured to store the expendable and has a piezoelectric element attached thereto, a detection signal generation circuit configured to charge and discharge the piezoelectric element, and generate a detection signal including amplitude information, the amplitude information representing whether an amplitude of a remaining vibration of the piezoelectric element after the discharge is greater than a preset threshold value, and a control module configured to control the charge and the discharge of the piezoelectric element by the detection signal generation circuit. The amplitude information is available for determining whether the residual quantity of the expendable is greater than a preset level. The control module is capable of varying the preset threshold value.

The second application of the invention provides the amplitude information, which is used to determine whether the residual quantity of the expendable is greater than the preset level. The amplitude information represents whether the amplitude of the remaining vibration of the piezoelectric element after the discharge is greater than the preset threshold value. The threshold value is variable, and adequate setting of the threshold value ensures easy measurement of the residual quantity of the expendable. The discharge characteristic is set to have a distinctive difference in amplitude, depending upon the residual quantity of the expendable that is greater than the preset level or less than the preset level. The discharge characteristic may be set by trial and error.

In these configurations of the expendable container, the control module is preferred to regulate at least one of a discharge time constant and a discharge time in the discharge of the piezoelectric element by the detection signal generation circuit, so as to vary a discharge characteristic of the piezoelectric element.

This preferable structure sets the discharge characteristic to have a distinct difference in amplitude of the remaining vibration when the residual quantity of the expendable is greater than the preset level and when the residual quantity of the expendable is less than the preset level. This further enhances the reliability of the measurement.

In these configurations of the expendable container, the detection signal generation circuit is preferred to generate the detection signal according to a number of specific peaks, the specific peak being an output voltage of the piezoelectric element after the discharge higher than a reference voltage for residual quantity detection as the preset threshold value.

In these configurations of the expendable container, the control module is preferred to set the reference voltage for residual quantity detection to make the number of the specific peaks in a predetermined range, when the residual quantity of the expendable is greater than the preset level. This arrangement ensures the enhanced reliability of the measurement based on the number of the higher peaks.

In these configurations of the expendable container, the control module is preferred to set the reference voltage for residual quantity detection to make the number of the specific peaks equal to zero, when the residual quantity of the expendable is greater than the preset level.

In this structure, the detection signal generation circuit readily generates the detection signal, depending upon whether the output voltage of the piezoelectric element after the discharge has the peak higher than the reference voltage.

In these configurations of the expendable container, a non-volatile memory is preferred to store setting information on the reference voltage for residual quantity detection, the setting information on the reference voltage for residual quantity detection representing a relation between the reference voltage for residual quantity detection and piezoelectric element characteristic information indicative of a characteristic of the piezoelectric element, wherein the control module is capable of setting the reference voltage for residual quantity detection according to a given piece of the piezoelectric element characteristic information and the setting information on the reference voltage for residual quantity detection.

This structure measures the characteristic of the piezoelectric element and generates the piezoelectric element characteristic information. The discharge characteristic of the piezoelectric element is set according to the generated piezoelectric element characteristic information. This arrangement effectively relives the work load of setting the reference voltage for residual quantity detection due to a variation in characteristic of the piezoelectric element. The measurement of the characteristic of the piezoelectric element may be carried out at the time of product inspection of the piezoelectric element, for reduction of the work load of the measurement.

In these configurations of the expendable container, the piezoelectric element characteristic information is preferred to be a rank selected among multiple ranks according to a measurement of the characteristic of the piezoelectric element, and the control module is configured to set the reference voltage for residual quantity detection in response to the selected rank.

In these configurations of the expendable container, the control module controls is preferred to have a test mode to control the detection signal generation circuit to measure an output voltage of the piezoelectric element after a preset time period has elapsed since a last charge or discharge operation of the piezoelectric element, and also to control the detection signal generation circuit to generate a failure detection signal according to a presence or absence of a specific peak where an output voltage wave of the piezoelectric element is higher than a reference voltage for function check.

The failure detection signal is utilized to detect the presence or the absence of a failure of the expendable container. This structure thus desirably ensures detection of a failure of the expendable container including the piezoelectric element and its control circuit.

In these configurations of the expendable container, a non-volatile memory configured to store setting information on the reference voltage for function check, the setting information on the reference voltage for function check representing a relation between the reference voltage for function check and piezoelectric element characteristic information representing a characteristic of the piezoelectric element, wherein the control module is capable of setting the reference voltage for function check according to a given piece of the piezoelectric element characteristic information and the setting information on the reference voltage for function check.

In these configurations of the expendable container, the piezoelectric element characteristic information is a rank selected among multiple ranks according to a measurement of a characteristic of the piezoelectric element, and the control module is configured to set the reference voltage for function check in response to the selected rank.

The present invention may also be realized in various other forms, such as a residual quantity measuring device, a residual quantity measuring control method, a residual quantity measuring control device, and a computer program for realizing the functions of such a method or device by means of a computer, a computer-readable recording medium having such a computer program stored thereon, a data signal including such a computer program and embodied in a carrier wave, a print head, and a cartridge, and a combination thereof.

BRIEF DESCRIPTION OF THE DRAWINGS

FIG. 3 is a block diagram showing a logic circuit 130 included in the ink cartridge 100;

FIG. 8 shows a mapping of sensor rank to setting of a reference voltage for noise reduction;

FIG. 15 shows a mapping (table) of sensor rank to setting of a reference potential Vref in the second embodiment of the invention;

BEST MODES OF CARRYING OUT THE INVENTION

Some modes of carrying out the invention are discussed as preferred embodiments in the following sequence:

A. Structure of Ink Cartridge in First Embodiment of the Invention

B. Electrical Structure of Ink Cartridge in First Embodiment of the Invention

Figure 1:
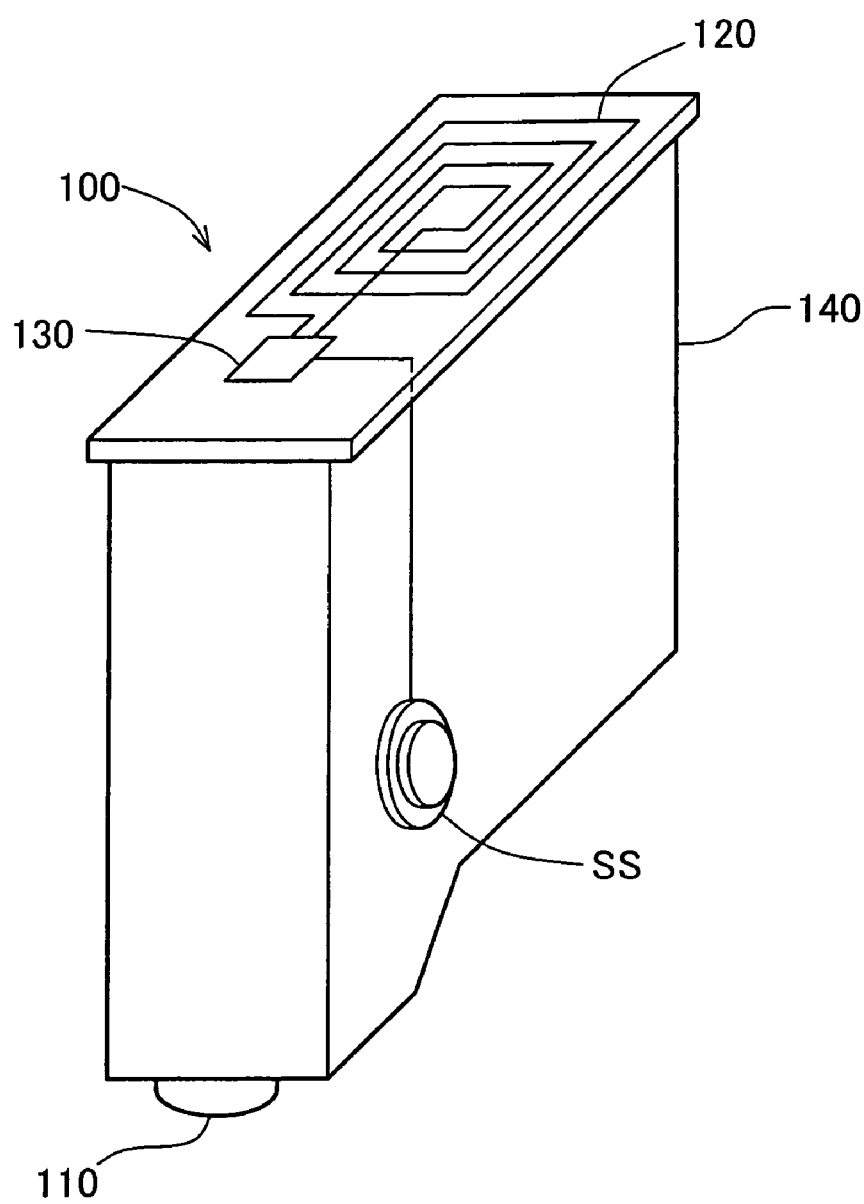
FIG. 1 is a perspective showing the appearance of an ink cartridge 100 in one embodiment of the invention.

C. Circuit Structure of Residual Ink Quantity Detection Unit in First Embodiment of the Invention D. Residual Ink Quantity Measurement Process in First Embodiment of the Invention E. Details of Discharge Characteristic Setting Process in First Embodiment of the Invention F. Residual Ink Quantity Measurement Process in Second Embodiment of the Invention G. Modifications A. Structure of Ink Cartridge in First Embodiment of the Invention FIG. 1 is a perspective showing the appearance of an ink cartridge 100 in a first embodiment of the invention. The ink cartridge 100 has a casing 140 to keep one ink as an expendable therein. An ink supply port 110 is formed on the bottom of the casing 140 to feed ink to a printer as discussed below. An antenna 120 and a logic circuit 130 are located on the top of the casing 140 and are used to establish wireless communication with the printer. A sensor SS is attached to the side wall of the casing 140 and is used to measure a residual quantity of ink. The sensor SS is electrically linked to the logic circuit 130.

FIG. 2 is sectional views showing the sensor SS attached to the side wall of the casing 140 of the ink cartridge 100. The sensor SS includes a piezoelectric element PZT that has piezoelectric characteristics including piezoelectric effect and inverse piezoelectric effect, two electrodes 10 and 11 that function to apply a voltage to the piezoelectric element PZT, and a sensor attachment 12. The electrodes 10 and 11 are connected with the logic circuit 130. The sensor attachment 12 is a thin-film structural element of the sensor SS to transmit vibrations from the piezoelectric element PZT to the ink and the casing 140.

Figure 2A:
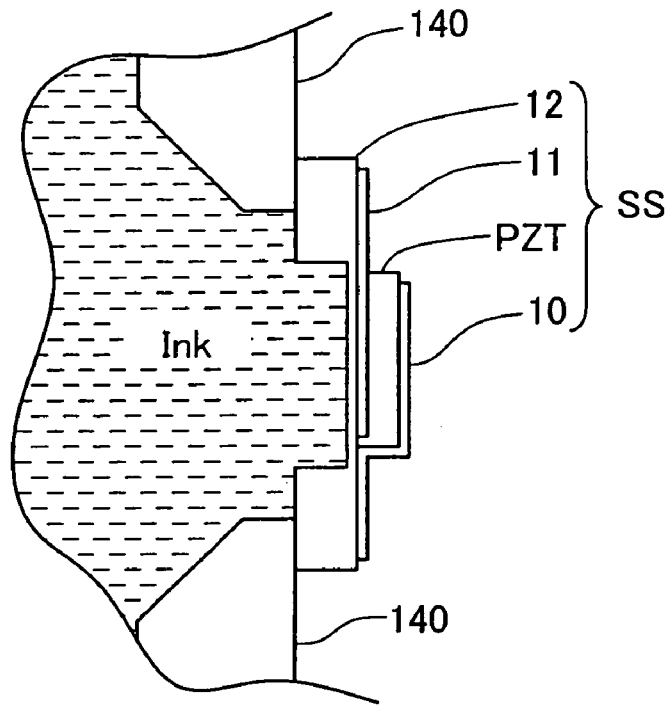
FIGS. 2(a) and 2(b) are sectional views showing a sensor SS attached to side wall of a casing 140 of the ink cartridge 100.
Figure 2B:
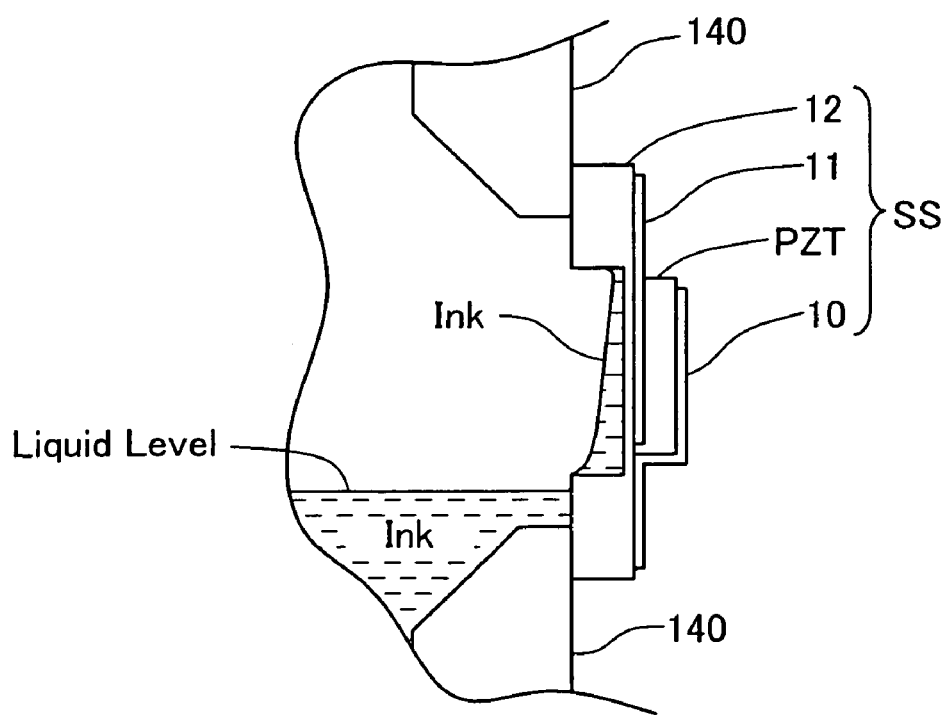

In the state of FIG. 2(a), the residual quantity of ink exceeds a preset level, and the liquid level of ink is higher than the position of the sensor SS (see FIG. 1). In the state of FIG. 2(b), the residual quantity of ink does not reach the preset level, and the liquid level of ink is lower than the position of the sensor SS. As clearly understood from these drawings, when the liquid level of ink is higher than the position of the sensor SS, the sensor SS, the casing 140, and all the ink work as a vibration body. When the liquid level of ink is lower than the position of the sensor SS, on the other hand, the sensor SS, the casing 140, and only a trace amount of ink adhering to the sensor SS work as a vibration body. This means that the vibration characteristics about the piezoelectric element PZT vary with a variation in residual quantity of ink. The technique of this embodiment takes advantage of such a variation of the vibration characteristics to measure the residual quantity of ink. The details of the measurement method will be discussed later.

B. Electrical Structure of Ink Cartridge in First Embodiment of the Invention

FIG. 3 is a block diagram showing the logic circuit 130 included in the ink cartridge 100. The logic circuit 130 includes an RF circuit 200, a controller 210, an EEPROM 220 as a non-volatile memory, a residual ink quantity detection circuit 230, an electric power generator 240, and a charge pump circuit 250.

The RF circuit 200 has a demodulator 201 that demodulates radio wave received from a printer 20 via the antenna 12, and a modulator 202 that modulates signals received from the controller 210 and sends the modulated signals to the printer 20. The printer 20 uses its antenna 121 to send baseband signals on a carrier wave of a preset frequency to the ink cartridge 100. The ink cartridge 100, on the other hand, does not use a carrier wave but changes a load of its antenna 120 to vary an impedance of the antenna 121. The ink cartridge 100 takes advantage of such a variation in impedance to send signals to the printer 20. The ink cartridge 100 and the printer 20 establish two-way communication in this manner.

The electric power generator 240 rectifies the carrier wave received by the RF circuit 200 and generates electric power of a specified voltage (for example, 5 V). The electric power generator 240 supplies the generated electric power to the RF circuit 200, the controller 210, the EEPROM 220, and the charge pump circuit 250. The charge pump circuit 250 boosts up the received electric power to a preset level of voltage demanded by the sensor SS and supplies the boosted-up electric power to the residual ink quantity detection circuit 230.

Figure 4:
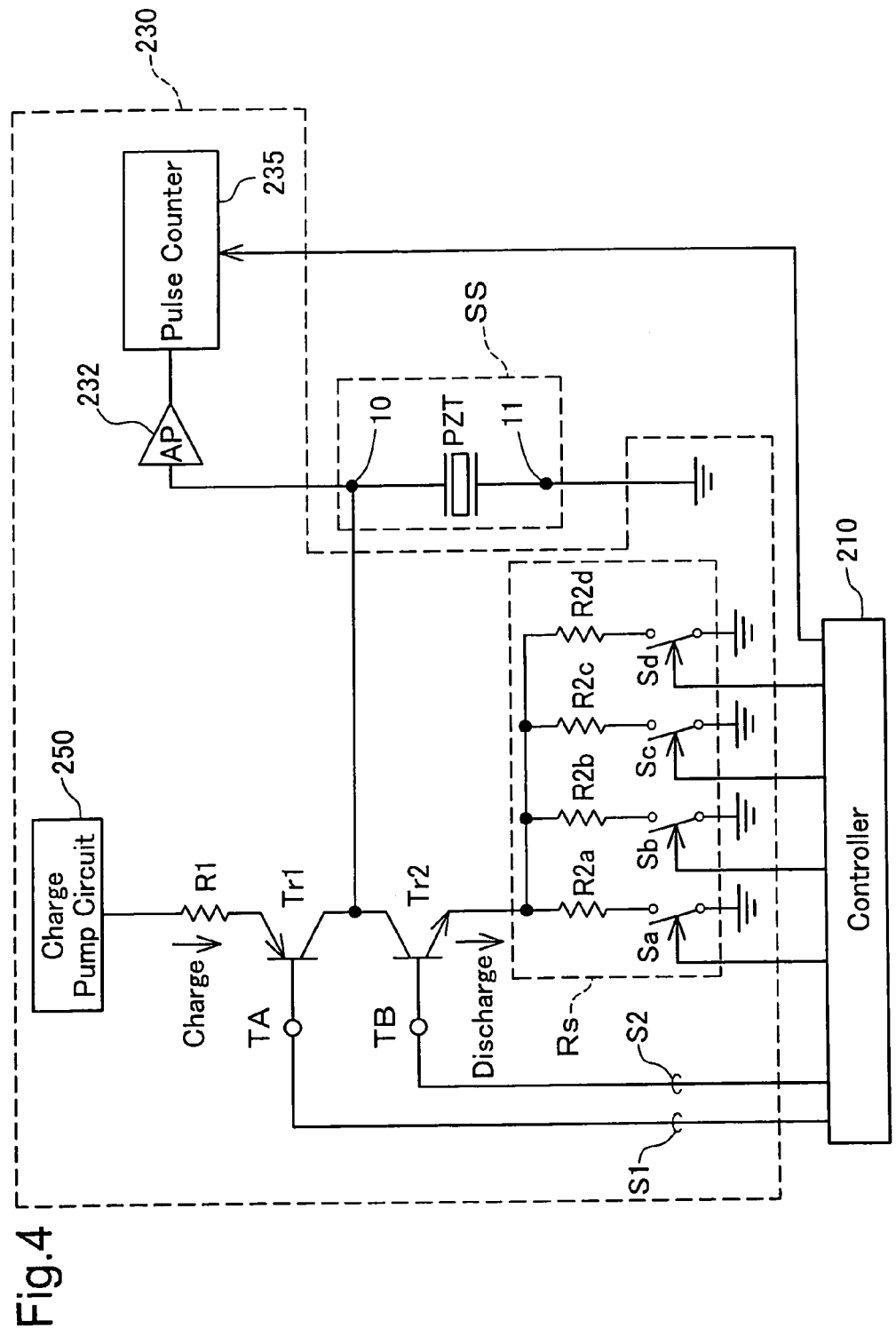
FIG. 4 is a circuit diagram showing the circuit structure of a residual ink quantity detection circuit 230 and the sensor SS.

C. Circuit Structure of Residual Ink Quantity Detection Unit in First Embodiment of the Invention FIG. 4 is a circuit diagram showing the circuit structure of the residual ink quantity detection circuit 230 and the sensor SS. The residual ink quantity detection circuit 230 includes a PNP transistor Tr1, an NPN transistor Tr2, a charge-time constant adjustment resistor R1, a discharge time constant adjustment resistive circuit Rs, an amplifier 232, and a pulse counter 235. The sensor SS is connected to the residual ink quantity detection circuit 230 by the two electrodes 10 and 11 (see FIG. 2).

The discharge time constant adjustment resistive circuit Rs has four discharge time constant adjustment resistors R2a, R2b, R2c, and R2d and four corresponding switches Sa, Sb, Sc, and Sd respectively connected therewith. The four switches Sa, Sb, Sc, and Sd are opened and closed by the controller 210. The controller 210 sets a value of resistance in the discharge time constant adjustment resistive circuit Rs by a combination of the open-close positions of these four switches Sa, Sb, Sc, and Sd.

The PNP transistor Tr1 has the following connections. Its base is linked to a terminal TA that receives a charge control signal S1 as a control output from the controller 210. Its emitter is linked to the charge pump circuit 250 via the charge-time constant adjustment resistor R1. Its collector is linked to one electrode 10 of the sensor SS, whereas the other electrode 11 of the sensor SS is grounded.

The NPN transistor Tr2 has the following connections. Its base is linked to a terminal TB that receives a discharge control signal S2 as a control output from the controller 210. Its collector is linked to one electrode 10 of the sensor SS. Its emitter is grounded via the discharge time constant adjustment resistive circuit Rs with the variable setting of resistance.

The pulse counter 235 is connected with the electrode 10, which is linked to the piezoelectric element PZT, via the amplifier 232 that amplifies the output voltage of the piezoelectric element PZT. The pulse counter 235 is connected to the controller 210 to receive a control output from the controller 210.

Figure 5:
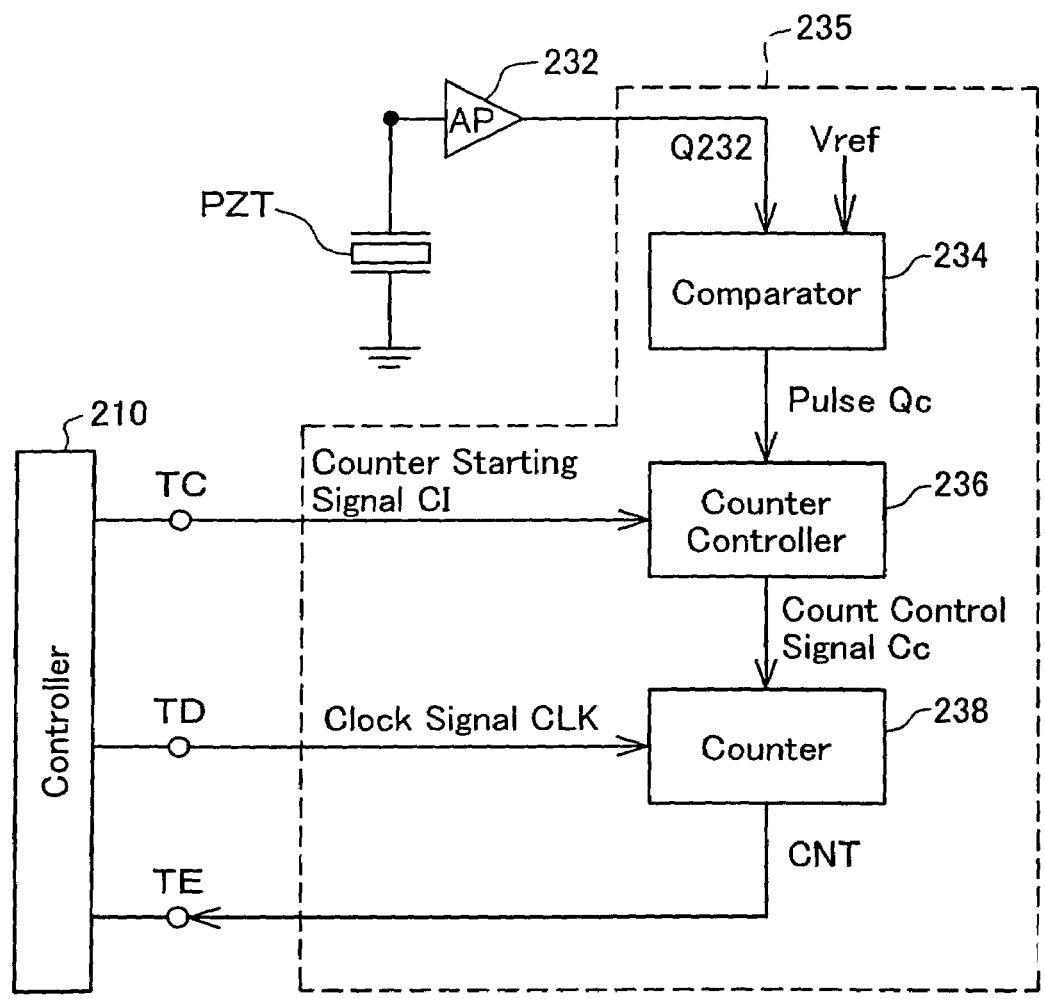
FIG. 5 is a block diagram showing the structure of a pulse counter 235 included in the residual ink quantity detection circuit 230.

FIG. 5 is a block diagram showing the structure of the pulse counter 235 included in the residual ink quantity detection circuit 230. The pulse counter 235 has a comparator 234, a counter controller 236, a counter 238, and a non-illustrated oscillator. The comparator 234 receives an output Q232 of the amplifier 232 as an object of analysis and a reference potential Vref. The counter controller 236 and the counter 238 are linked to the controller 210. The residual ink quantity detection circuit 230 and the reference potential Vref respectively correspond to the 'detection signal generation circuit' and the 'reference voltage for residual quantity detection' of the invention. The counter controller 236 and the counter 238 correspond to the 'signal generator' of the invention.

Figure 6:
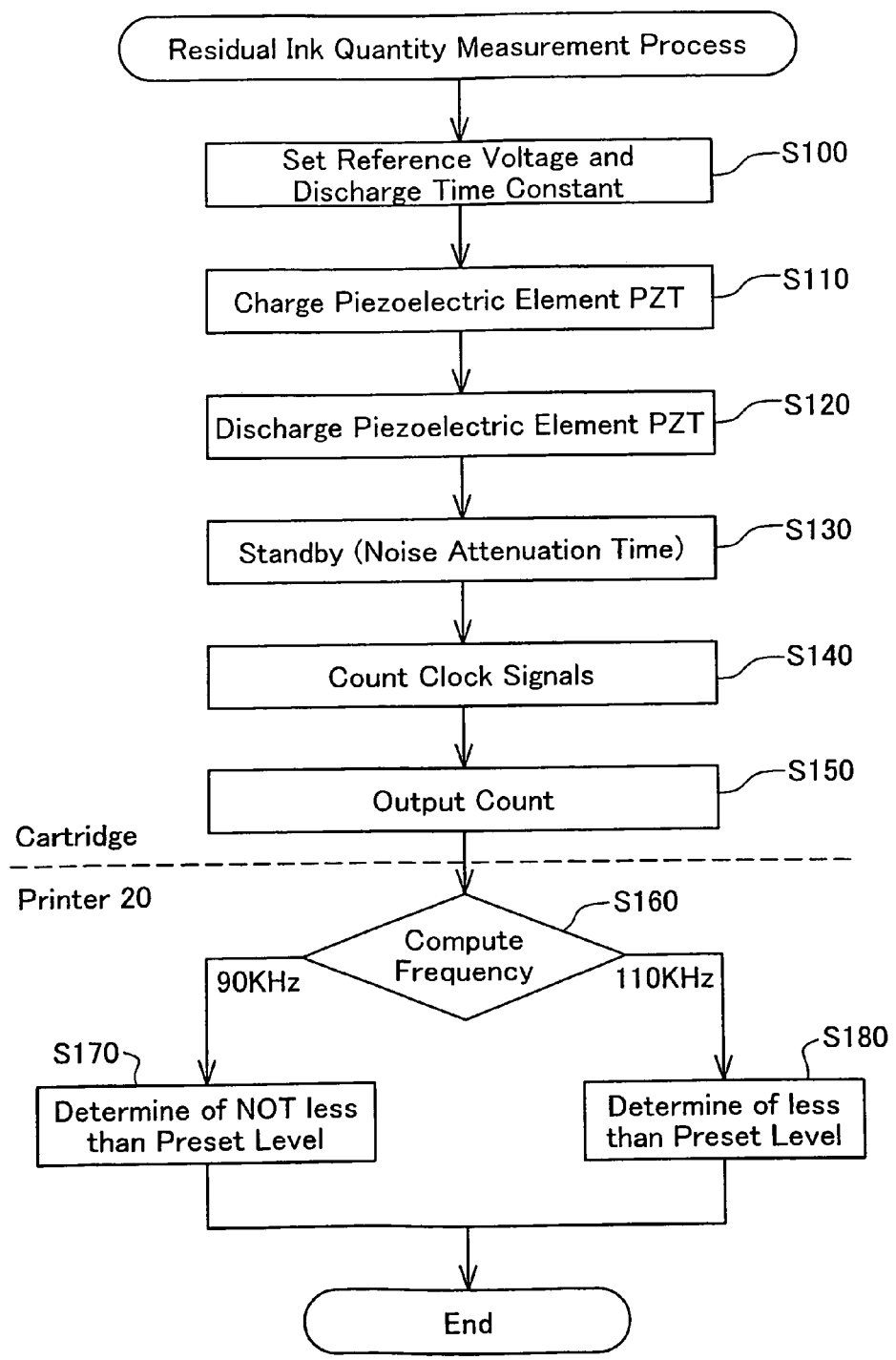
FIG. 6 is a flowchart showing a residual ink quantity measurement process executed in a first embodiment of the invention.
Figure 7:
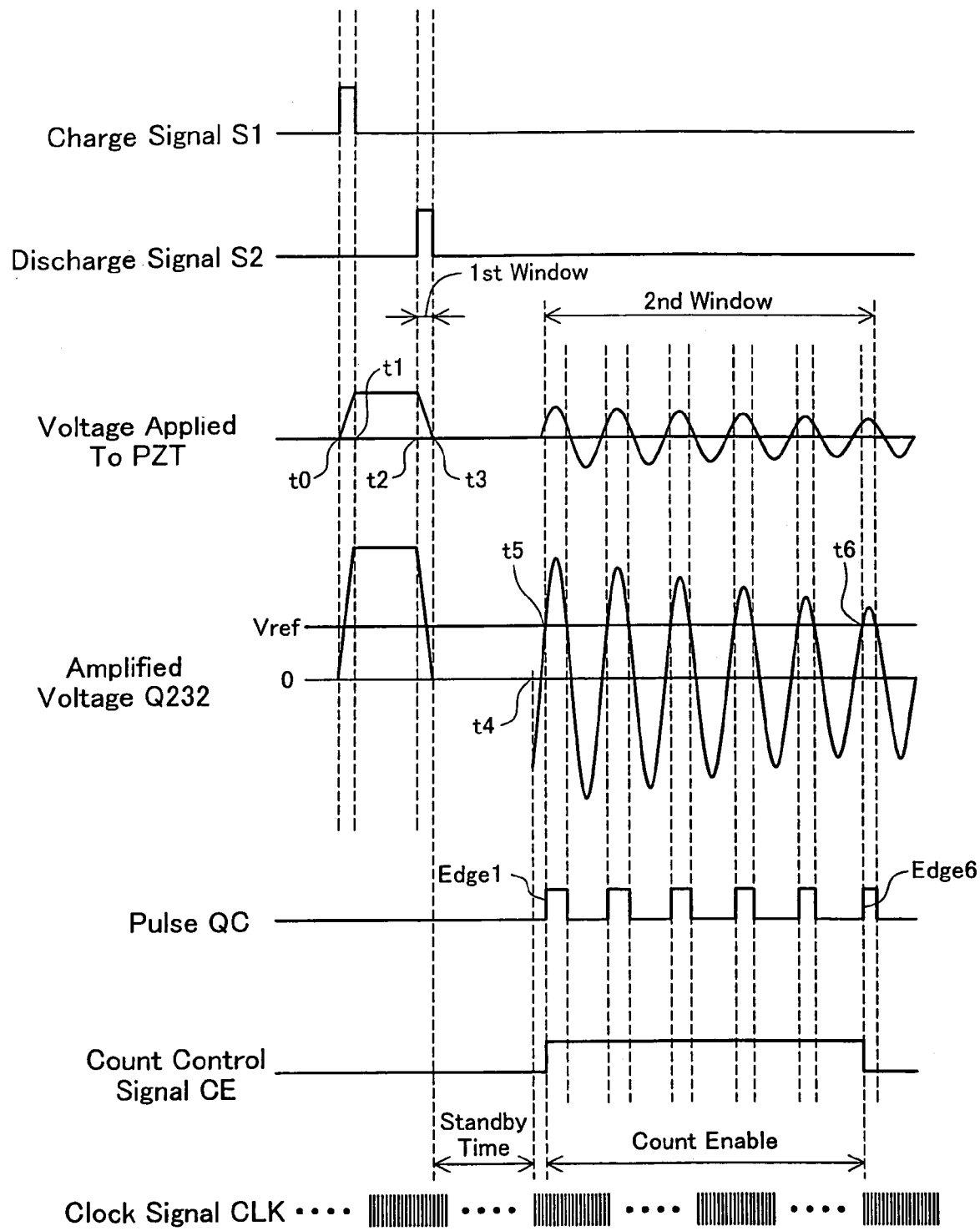
FIG. 7 is a timing chart showing the operations of the residual ink quantity detection circuit 230 and the sensor SS.

D. Residual Ink Quantity Measurement Process in First Embodiment of the Invention FIG. 6 is a flowchart showing a residual ink quantity measurement process executed in the first embodiment of the invention. FIG. 7 is a timing chart showing the operations of the residual ink quantity detection circuit 230 and the sensor SS in this measurement process. This measurement process is executed by both the ink cartridge 100 and the printer 20, in response to the user's power switch-on operation of the printer 20.

The piezoelectric element PZT of the ink cartridge 100 is charged for a time period between time points t0 and t1 and is discharged for a time period between time points t2 and t3 (a first window W1). After a preset standby time, the frequency of an output voltage wave from the piezoelectric element PZT is measured (a second window W2). The concrete procedure counts the number of clock signals CLK generated while the pulses of the output voltage wave from the piezoelectric element PZT reach a predetermined number (for example, 5). The printer 20 computes the frequency of the voltage wave from the count and estimates a remaining state of ink according to the computed frequency. The detailed procedure is discussed below.

At step S100, the controller 210 (see FIG. 4) sets a discharge time constant of the piezoelectric element PZT and the reference potential Vref. The discharge time constant of the piezoelectric element PZT is specified by setting the open-close positions of the four switches Sa, Sb, Sc, and Sd included in the discharge time constant adjustment resistive circuit Rs. The details of this processing will be discussed later. The reference potential Vref is automatically set according to a given sensor rank and a table discussed later. The sensor rank and the table are stored in the EEPROM 220 in the manufacturing process of the ink cartridge 100.

FIG. 8 shows a mapping (table) of the sensor rank to the setting of the reference potential Vref in the first embodiment. The sensor rank represents the characteristics of the sensor, for example, a variation in distortion with a variation of the voltage applied (or the output voltage). For example, the manufacturer of the sensor SS may actually measure the characteristics of the sensor to specify the sensor rank. In the structure of this embodiment, the sensor SS is classified in one of eight sensor ranks A to H. The sensor rank corresponds to the 'piezoelectric element characteristic information' of the invention.

At step S110, the controller 210 (FIG. 4) outputs the charge control signal S1 to the terminal TA to switch the transistor Tr1 ON (at the time point t0 in FIG. 7). A flow of electric current then runs from the charge pump circuit 250 to the piezoelectric element PZT to apply a voltage onto the piezoelectric element PZT having a capacitance. In the initial stage, the two transistors Tr1 and Tr2 are both set OFF.

The controller 210 switches the transistor Tr1 OFF at the time point t1 and causes the residual ink quantity detection circuit 230 to stand by until the time point t2. The standby to the time point t2 attenuates the vibrations of the piezoelectric element PZT, which are caused by application of the voltage. A non-illustrated internal clock of the controller 210 is used to measure the time.

At step S120, the controller 210 (FIG. 4) sends the discharge control signal S2 to the terminal TB to switch the transistor Tr2 ON at the time point t2 and OFF at the time point t3. This enables discharge of the piezoelectric element PZT for a time period between the time point t2 and the time point t3. The piezoelectric element PZT is deformed abruptly by the discharge to vibrate a sensor vibration system, which includes the sensor SS (FIG. 2), the casing 140 in the vicinity of the sensor SS, and ink.

Figure 9A:
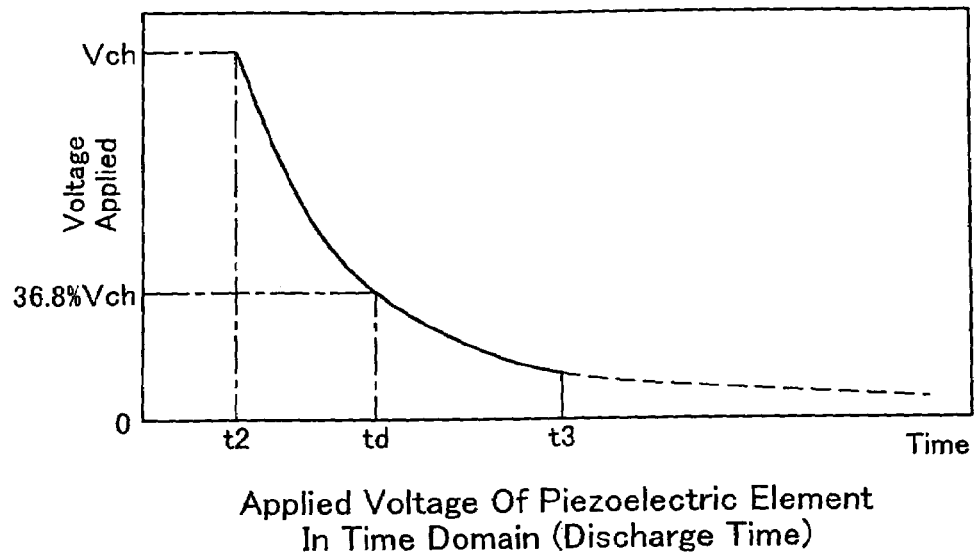
FIGS. 9(a) and 9(b) show a variation in applied voltage (potential difference from the grounding potential) of a piezoelectric element PZT.

FIG. 9 shows a discharge waveform of the piezoelectric element PZT in the discharge time. FIG. 9(a) shows a discharge waveform in a time domain. The data given below show the potentials at respective time points:

(1) discharge start time t2: a potential Vch (an output potential of the charge pump circuit 250);

(2) time constant time td: a potential decreasing from the potential Vch by 63.2%; and (3) discharge end time t3: a potential slightly higher than the ground potential (see FIG. 9).

Here the time constant time td represents a time point when the time constant elapses from the discharge start time t2. The discharge end time t3 is set in advance to be suitable for measurement according to the characteristics of the sensor SS. The method of setting such time points will be discussed later. In the specification hereof, the discharge time represents a time period between the discharge start time t2 and the discharge end time t3 when the piezoelectric element PZT is electrically connected with the grounding.

Figure 9B:
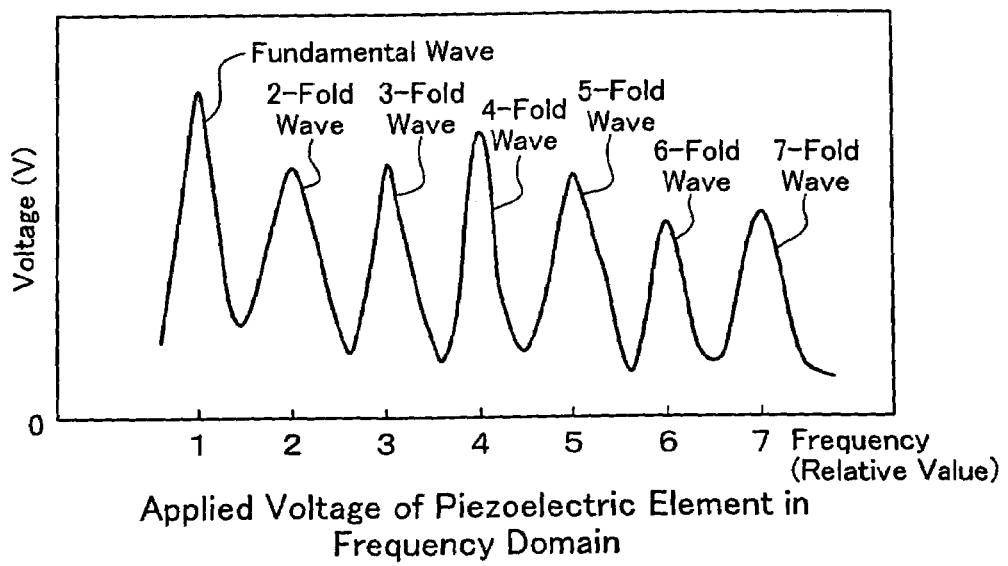

FIG. 9(b) shows a fundamental harmonic and multiple higher harmonics of the applied voltage in a frequency domain. This shows results of Fourier analysis of a hypothetic waveform on the assumption that the waveform of the applied voltage of the piezoelectric element PZT in the first window W1 (FIG. 7) is repeated permanently. The voltage waveform of the applied voltage gives a fundamental harmonic having a fundamental frequency or the reciprocal of the discharge time and higher harmonics having frequencies of integral multiples. On condition that the deformation of the piezoelectric element PZT has a linear relation to the applied voltage, the waveform of the vibration force coincides with the waveform of the applied voltage.

Figure 10:
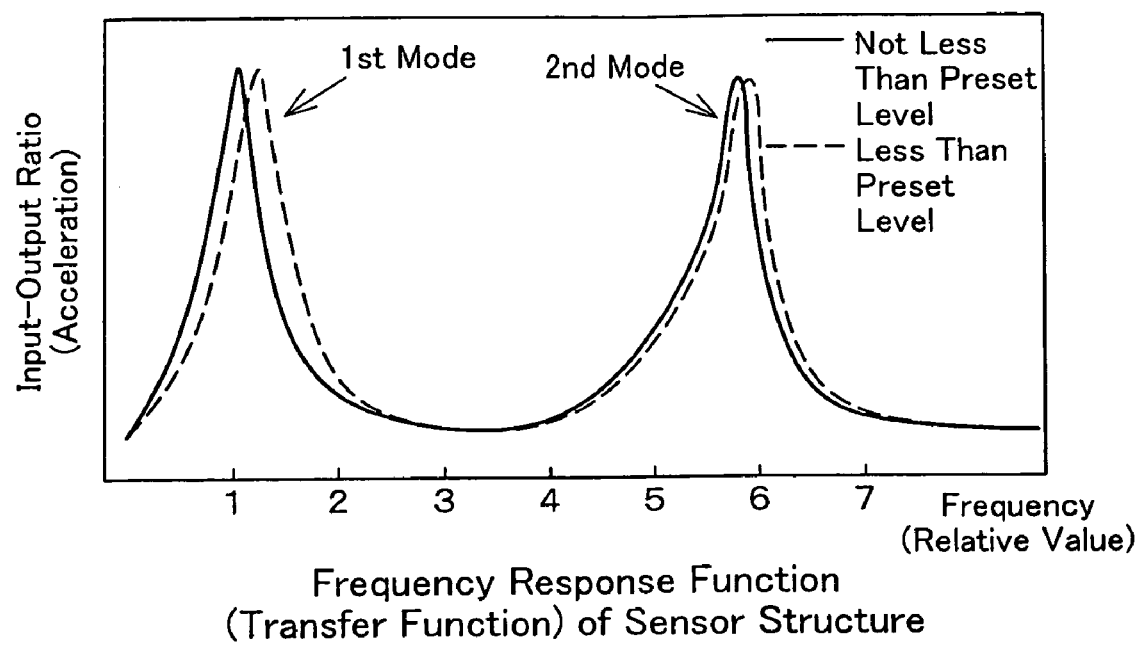
FIG. 10 shows variations in frequency response function (Transfer Function) of a sensor vibration system including the sensor SS.

FIG. 10 shows variations in frequency response function (Transfer Function) of the sensor vibration system including the sensor SS. The frequency response function represents a relation between input and output of a vibration transmission system included in the sensor vibration system and is expressed by a ratio of an input Fourier spectrum to an output Fourier spectrum. The frequency response function of the embodiment is a ratio of a Fourier spectrum of the discharge waveform of the piezoelectric element PZT (having a linear relation to the vibration force) to a Fourier spectrum of the free vibration of the sensor vibration system.

The first mode and the second mode in FIG. 10 are two eigenmodes of the sensor vibration system. The eigenmode represents a vibration form of the sensor vibration system. Any object has a specific form in vibration and can not vibrate in any other form. This specific form corresponds to the eigenmode. The eigenmode of the object is identified by modal analysis.

It is assumed that the ink cartridge 100 has the following two vibration modes:

(1) In the first mode, a recess of the sensor SS (see FIG. 2) is deformed like a bowl with the edges of the recess as nodes of vibration and the center of the recess as the largest-amplitude area of vibration; and (2) In the second mode, the recess of the sensor SS is deformed like a seesaw with both the edges and the center of the recess as nodes of vibration and the left and right middle areas between the edges and the center as the largest-amplitude areas of vibration.

The solid line curve of FIG. 10 shows a variation in frequency response function when the residual quantity of ink exceeds the preset level and the liquid level of ink is higher than the position of the sensor SS (see FIG. 1 and FIG. 2(a)). The dotted line curve of FIG. 10 shows a variation in frequency response function when the residual quantity of ink does not reach the preset level and the liquid level of ink is lower than the position of the sensor SS (see FIG. 2(b)).

Here the terminologies 'when the liquid level of ink is higher than the position of the sensor SS' and 'when the liquid level of ink is lower than the position of the sensor SS' respectively correspond to 'when the residual quantity of the expendable is greater than the preset level' and 'when the residual quantity of the expendable is smaller than the preset level' of the claimed invention.

The frequency response function varies with a variation in liquid level of ink, since the variation in liquid level of ink causes a variation of the vibration characteristics in the vicinity of the piezoelectric element PZT as described above. The variation of the vibration characteristics is ascribed to the fact that the sensor SS, the casing 140, and all the ink work as a vibration body when the liquid level of ink is higher than the position of the sensor SS, while the sensor SS, the casing 140, and only a trace amount of ink adhering to the sensor SS work as a vibration body when the liquid level of ink is lower than the position of the sensor SS.

Application of vibration causes free vibration in the sensor vibration system only at eigenfrequencies of the first mode and the second mode. Even when the piezoelectric element PZT applies vibration to the sensor vibration system at any other frequencies, free vibration arising in the sensor vibration system is extremely small and is immediately attenuated.

Figure 11A:
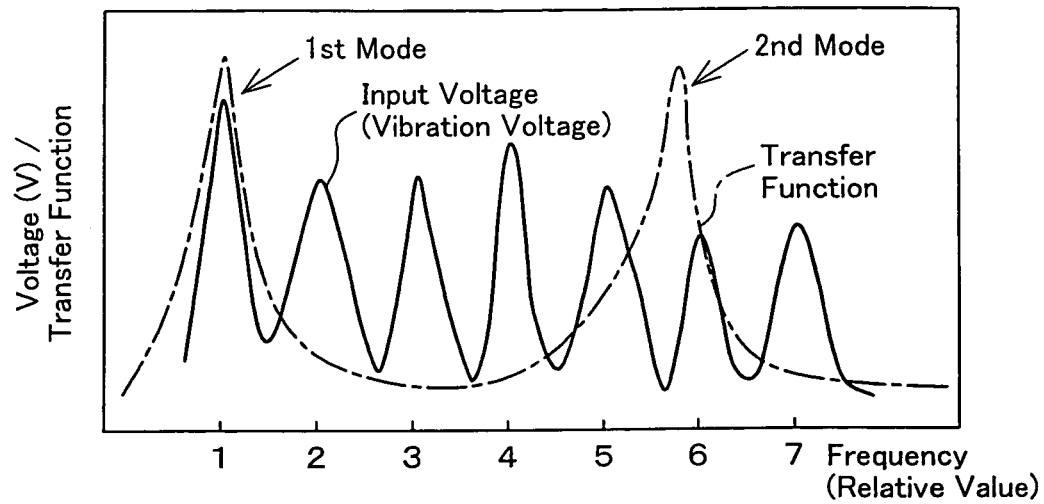
FIGS. 11(a) and 11(b) show generation of voltage in the piezoelectric element PZT in response to discharge of the piezoelectric element PZT.
Figure 11B:
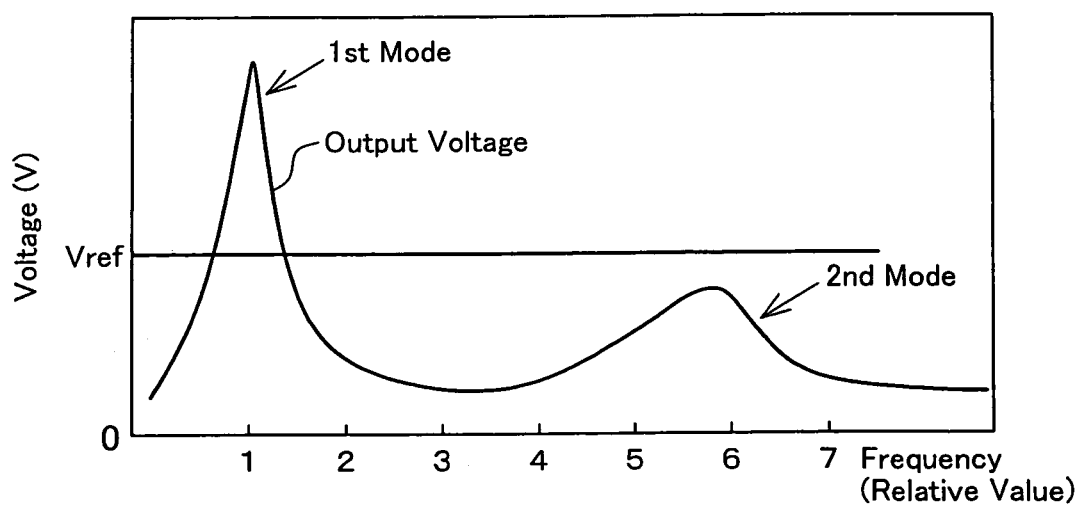

FIG. 11 shows generation of voltage in the piezoelectric element PZT in response to the free vibration of the piezoelectric element PZT. A solid line curve and a one-dot chain line curve of FIG. 11(a) respectively show a waveform of the applied voltage (in the discharge time) in a frequency domain (see FIG. 9(b)) and a variation in intermediate value of the frequency response function in the sensor vibration system described later. FIG. 11(b) shows an output voltage of the piezoelectric element PZT.

The intermediate value of the frequency response function is a middle value between the solid line curve and the dotted line curve in the frequency direction shown in FIG. 10 (for example, a logarithmic intermediate value). The use of the intermediate value ensures stable voltage output from the piezoelectric element PZT, regardless of the variation in residual quantity of ink. In the first embodiment, the eigenfrequencies of the first mode and the second mode are based on the intermediate value of the frequency response function.

As clearly understood from the graph of FIG. 11(a), the frequency of the fundamental harmonic of the discharge waveform is regulated to be substantially coincident with the eigenfrequency of the first mode in the sensor vibration system and to prevent the presence of any higher harmonic of the discharge waveform having a frequency coincident with the frequency of the second mode in the sensor vibration system. Significant free vibration accordingly arises only at the eigenfrequency of the first mode in the sensor vibration system. Namely a large voltage is generated in the piezoelectric element PZT only at the eigenfrequency of the first mode in the sensor vibration system (see FIG. 11(b)). This agrees well with the results of Fourier analysis of a hypothetic waveform on the assumption that the waveform of the output voltage of the piezoelectric element in the second window W2 (see FIG. 7) is repeated permanently.

The procedure of the first embodiment utilizes a subtle shift of the eigenfrequency of the first mode in the sensor vibration system to measure the liquid level of ink. The eigenfrequency of the first mode subtly shifts depending upon whether the liquid level of ink is higher than the position of the sensor SS. The positional relation between the sensor SS and the liquid level of ink is determined according to this subtle shift. The voltage waveform at the other frequencies is recognized as noise.

At step S130 (see FIG. 6), the controller 210 causes the residual ink quantity detection circuit 230 to stand by again for a time period between time points t3 and t4 in FIG. 7. This standby time is set for attenuation of unwanted vibrations as the noise source. The vibrations at the frequencies other than the eigenfrequencies of the first mode and the second mode are attenuated to practically disappear in the standby time.

The controller 210 (FIG. 5) outputs a counter starting signal CI to the counter controller 236 at the time point t4. The counter controller 236 receives the counter starting signal CI and outputs a count control signal CC to the counter 238. The count control signal CC rises at a first rising edge Edge1 of a pulse QC after the reception of the counter starting signal CI (at a time point t5) and falls at a sixth rising edge Edge6 (at a time point t6).

The reference potential Vref used as a reference of comparison in the comparator 234 is set to enable detection of only a voltage waveform due to the free vibration in the first mode as shown in FIG. 11(b). The procedure of this embodiment refers to the mapping (table) of the sensor rank to the setting of the reference potential (Vref) and a given sensor rank to implement such setting, as described previously. A desirable value is thus set to the reference potential Vref for restriction of the noise and detection of only the voltage waveform due to the free vibration in the first mode.

At subsequent step S140, the counter 238 counts the number of pulses of the clock signal CLK. Counting the number of pulses is carried out only while the counter 238 receives the count control signal CC. The number of pulses of the clock signal CLK is accordingly counted for a time period between the first rising edge Edge1 and the sixth rising edge Edge6 of the pulse QC after the time point t4. The procedure counts up the number of pulses of the clock signal CLK corresponding to five cycles of the voltage wave output from the piezoelectric element PZT.

At step S150, the counter 238 outputs the resulting count CNT. The output count CNT is sent to the printer 20. The printer 20 calculates the frequency of the voltage wave output from the piezoelectric element PZT from the received count CNT and a known cycle of the clock signal CLK.

At step S160, the printer 20 determines whether the residual quantity of ink exceeds the preset level, based on the calculated frequency. For example, it is assumed that the frequency is about 90 kHz when the liquid level of ink is higher than the position of the sensor SS, while being about 110 kHz when the liquid level of ink is lower than the position of the sensor SS. In this example, when the calculated frequency is 105 kHz, it is determined that the residual quantity of ink does not reach the preset level (steps S170 and S180).

The ink cartridge 100 of the first embodiment varies the reference potential Vref set in the comparator 234, as described above. Adequate setting of the reference potential Vref thus effectively restrains the noise and enhances the reliability of measurement.

Figure 12A:
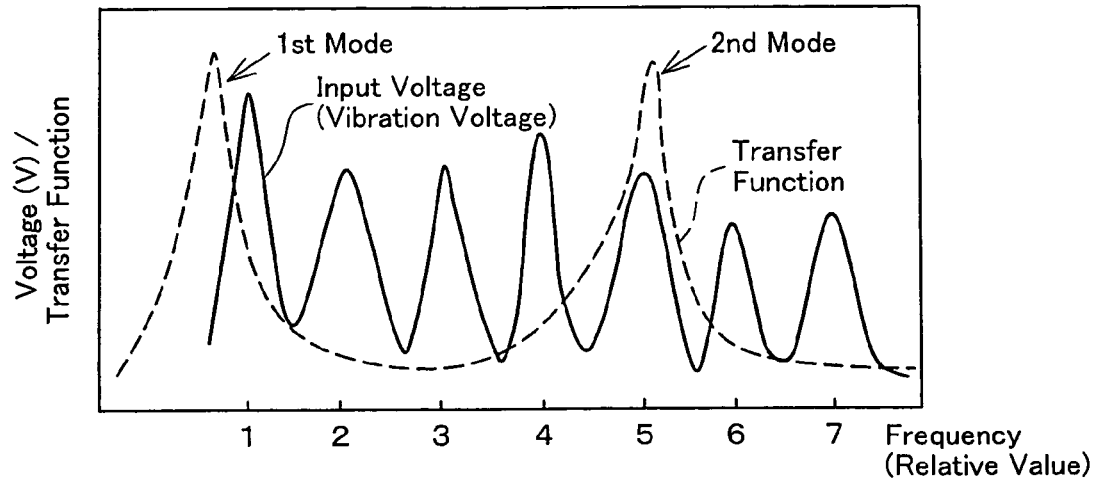
FIGS. 12(a) and 12(b) show generation of voltage in the piezoelectric element PZT in response to discharge of the piezoelectric element PZT.
Figure 12B:
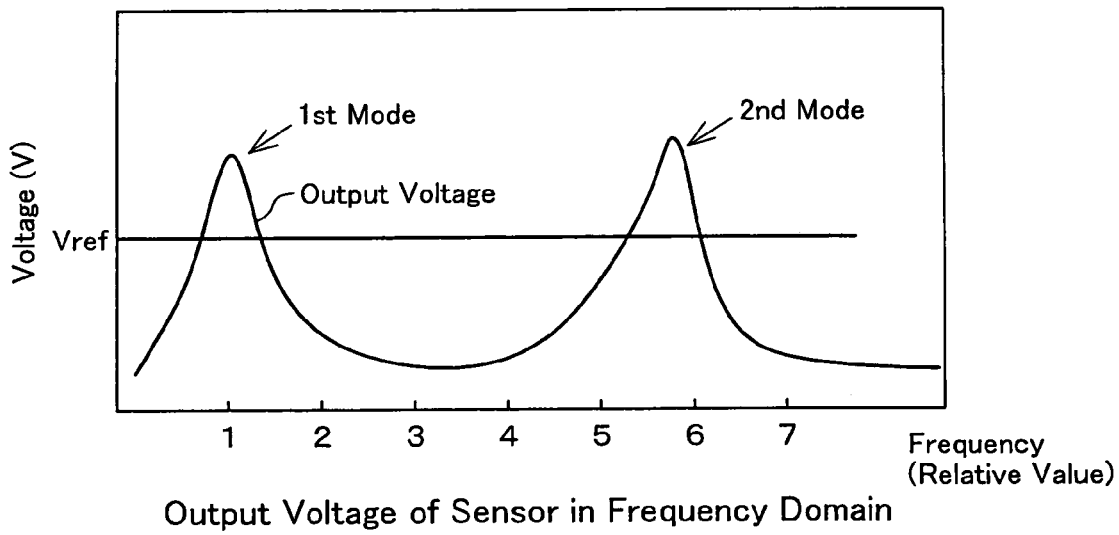

E. Details of Discharge Characteristic Setting Process in First Embodiment of the Invention FIG. 12 shows generation of voltage in the piezoelectric element PZT in response to the free vibration of the piezoelectric element PZT, as in FIG. 11. The difference is that generation of voltage in FIG. 12 is prior to adequate setting of the discharge characteristics. Before regulation of the discharge characteristics, the frequency of the fundamental harmonic of the applied voltage in the discharge time is not coincident with the eigenfrequency of the first mode in the sensor vibration system, while a higher harmonic of the applied voltage in the discharge time is coincident with the eigenfrequency of the second mode in the sensor vibration system.

Large voltages are accordingly generated at the eigenfrequency of the second mode, as well as at the eigenfrequency of the first mode. The voltage wave at the eigenfrequency of the second mode gives a significantly large noise to interfere with measurement of the residual quantity of ink. Generation of such a high voltage (noise) at the frequency other than the eigenfrequency of the first mode prevents noise removal by adequate setting of the reference potential Vref.

Figure 13A:
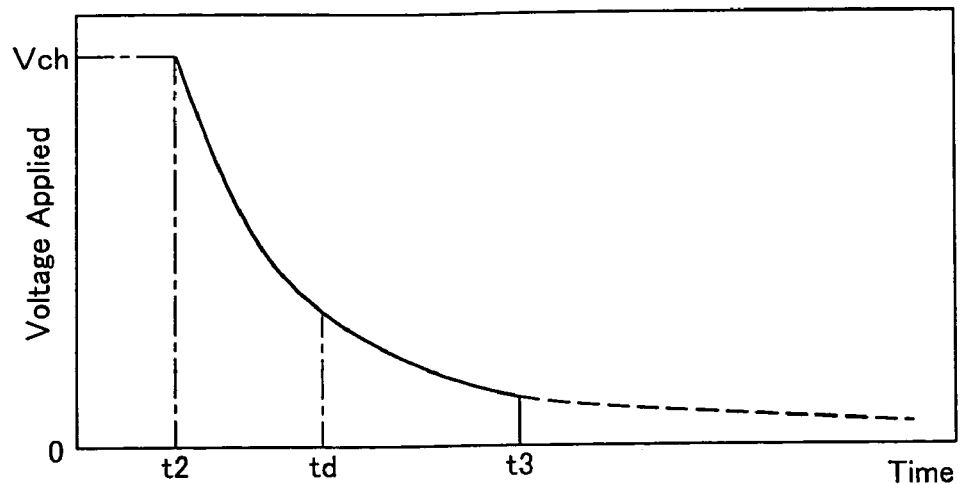
FIGS. 13(a) and 13(b) show a discharge characteristic setting process in the first embodiment of the invention.
Figure 13B:
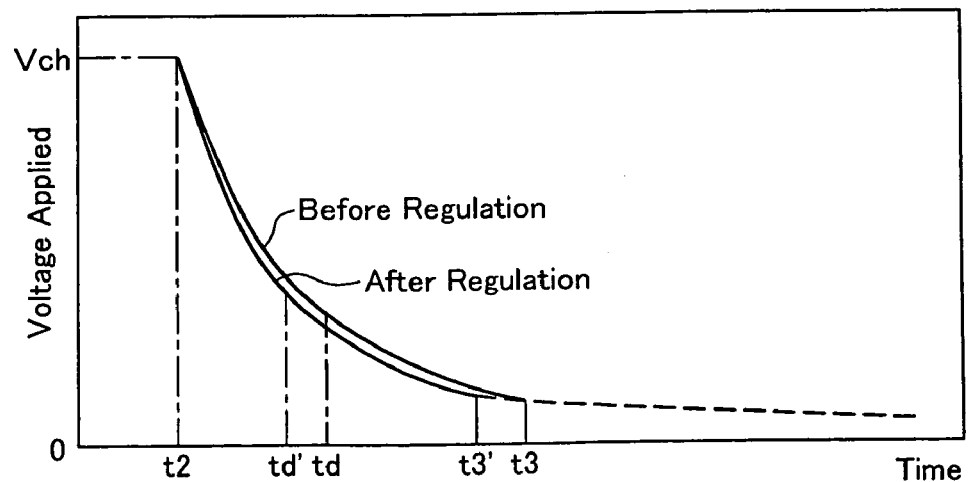

FIG. 13 shows a discharge characteristic setting process in the embodiment of the invention. FIG. 13(*a*) shows a discharge waveform after setting the discharge characteristics and is identical with FIG. 9(*a*). FIG. 13(*b*) shows a discharge waveform before setting the discharge characteristics.

In this illustrated example, a discharge time constant and a discharge time are set as the discharge characteristics. The discharge time constant is the product of a resistance between the piezoelectric element PZT and grounding and a capacitance of the piezoelectric element PZT. The discharge time constant is set by regulating the resistance in the discharge time constant adjustment resistive circuit Rs. The resistance in the discharge time constant adjustment resistivity circuit Rs is regulated by selecting an adequate combination of the open-close positions of the discharge time constant adjustment resistance control switches Sa, Sb, Sc, and Sd.

The discharge time is a time period when the piezoelectric element PZT is electrically connected with the grounding as mentioned above. More specifically the discharge time is a time period when the controller 210 sets the transistor Tr2 in the ON position. The controller 210 freely sets the discharge time.

The procedure changes the discharge time constant from a time constant Td' to a time constant Td, while extending the discharge end time from t3' to t3 to vary the discharge time. This gives the discharge waveform shown in FIG. 13(*a*).

The ink cartridge 100 of the first embodiment regulates at least either of the open-close positions of the switches included in the discharge time constant adjustment resistive circuit Rs and the actuation timing of the transistor Tr2 to change the discharge characteristics of the piezoelectric element PZT. Such regulation changes the characteristics of the remaining vibration after the discharge to have a higher S/N ratio suitable for detection of the residual quantity of ink.

Figure 14:
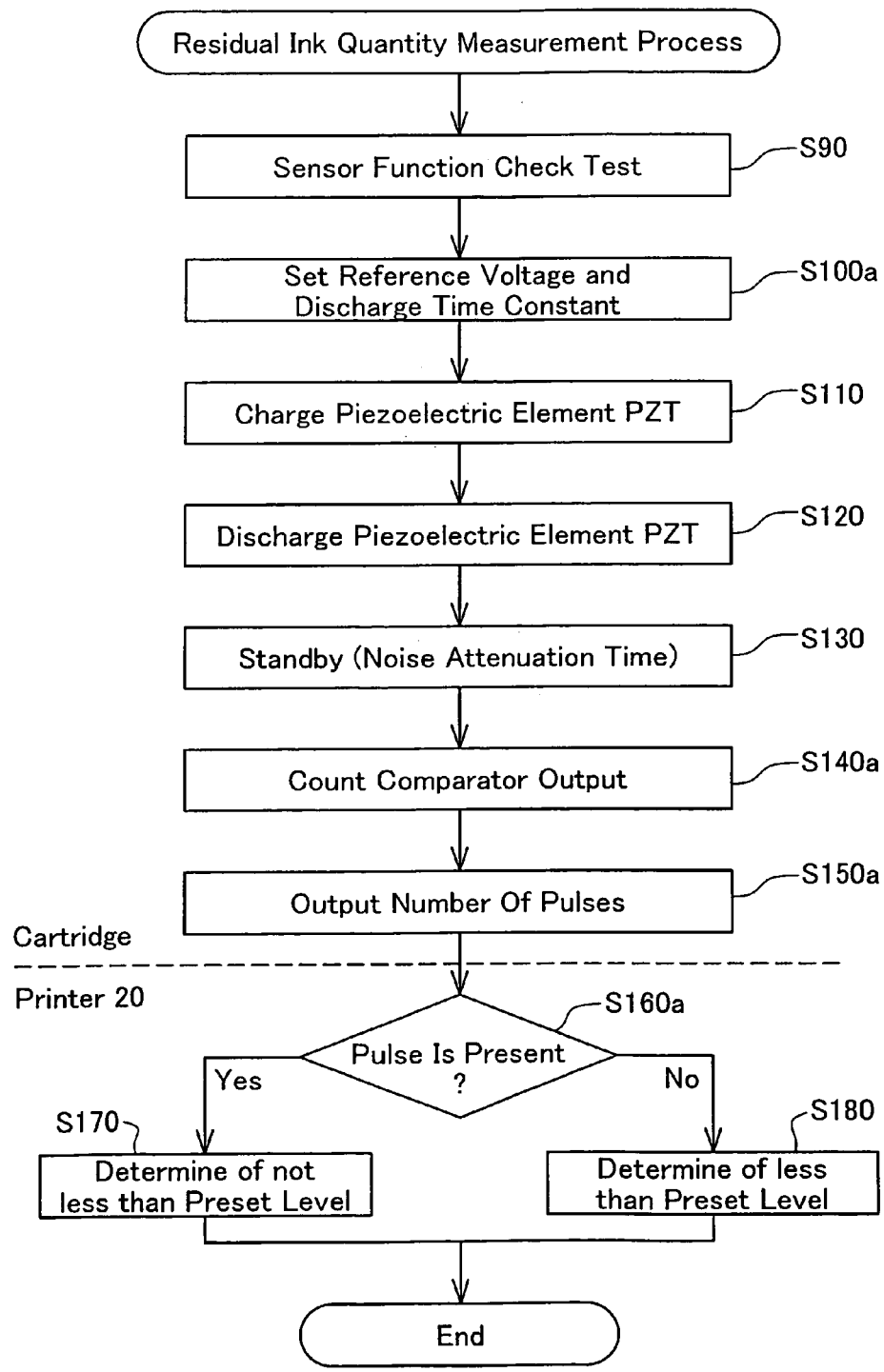
FIG. 14 is a flowchart showing a residual ink quantity measurement process executed in a second embodiment of the invention.

F. Residual Ink Quantity Measurement Process in Second Embodiment of the Invention FIG. 14 is a flowchart showing a residual ink quantity measurement process executed in a second embodiment of the invention. The primary differences of this flowchart from the flowchart of the first embodiment (FIG. 6) are given below:

(1) Step S90 is added to the flowchart of the first embodiment to check the functions of the sensor SS.

(2) Steps S100, S140, S150, and S160 are respectively changed to steps S100a, S140a, S150a, and S160a.

At step S90, the controller 210 carries out a function check test of the sensor SS. This test is performed to confirm that the sensor SS does not output any abnormal voltage. The abnormal voltage is an excess voltage output without charge or discharge. The function check test of the sensor SS is carried out to confirm no output of such an abnormal voltage from the sensor SS before measurement of the residual quantity of ink and thereby enhances the reliability of measurement.

The function check test of the sensor carries out (1) setting of the reference potential Vref (FIG. 5) and (2) confirmation of the pulse QC in this sequence:

Setting of the reference potential Vref: The controller 210 sets the reference potential Vref to a reference voltage for function check according to a given sensor rank and a predetermined table (see FIG. 15); and (2) Confirmation of the pulse QC: The controller 210 confirms that the pulse QC is unchanged but is kept at '0' for a preset time period (for example, 0.1 second).

This process confirms no output of an abnormal voltage from the sensor SS.

Confirmation of the pulse QC is carried out after a preset time period has elapsed since a last charge or discharge operation of the piezoelectric element PZT (that is, after the charge or discharge voltage wave is sufficiently attenuated), and may be performed after measurement of the residual quantity of ink.

At step S100a, the controller 210 (FIG. 4) resets the reference potential Vref and sets the discharge time constant of the piezoelectric element PZT. Resetting changes the reference potential Vref from the reference voltage for function check to a reference voltage for residual quantity detection (according to the sensor rank). The discharge time constant of the piezoelectric element PZT is set, based on a different concept from that of the first embodiment. The procedure of the first embodiment sets the discharge time constant to ensure stable output of a voltage wave from the sensor SS regardless of the residual quantity of ink. The procedure of the second embodiment, on the other hand, sets the discharge time constant to ensure output of a voltage wave having a relatively large amplitude only when the residual quantity of ink is less than a preset level. The discharge characteristic is set by adequately specifying the resistance of the discharge time constant adjustment resistive circuit Rs and the discharge time.

Figure 16:
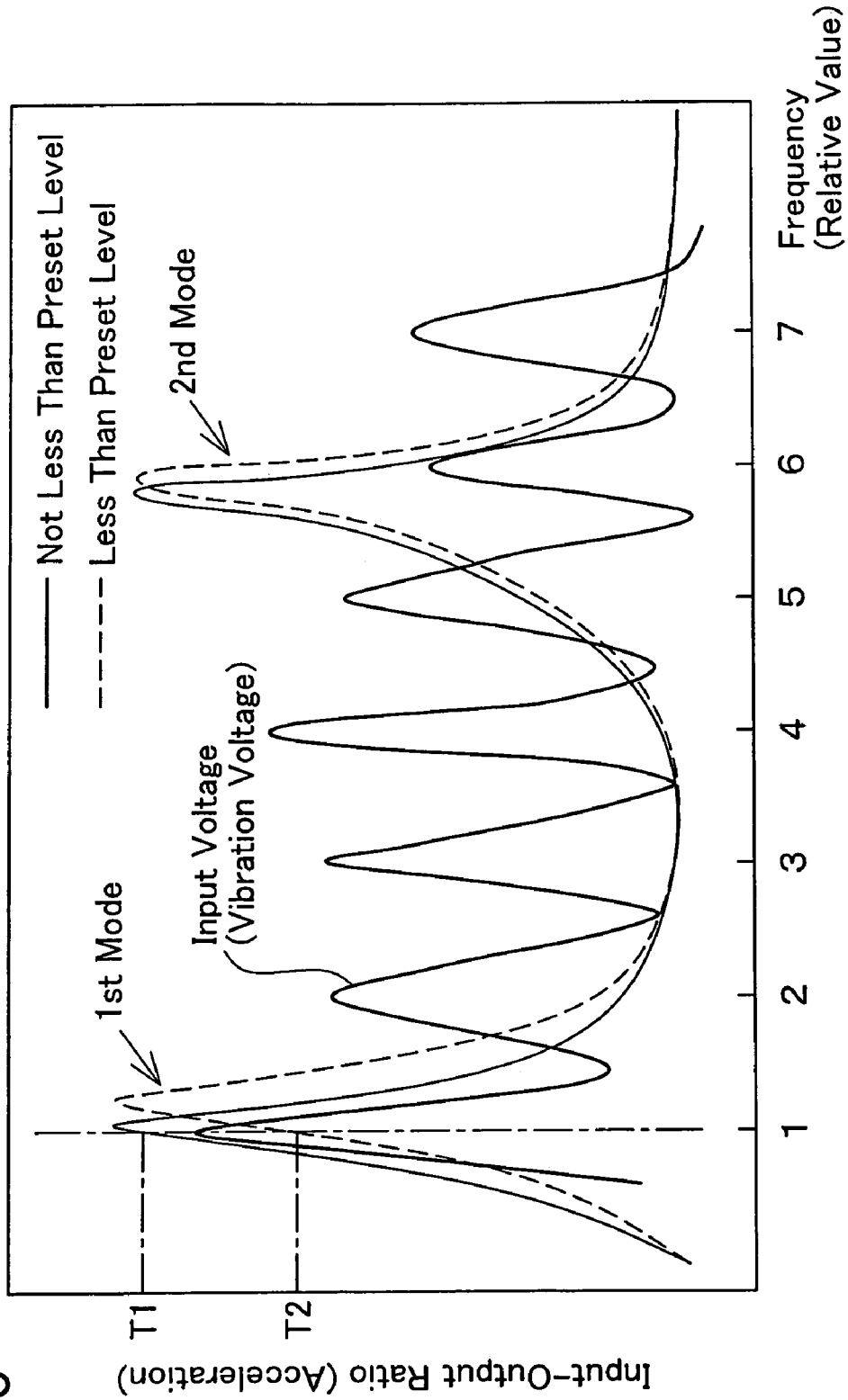
FIG. 16 shows a waveform of applied voltage (in the discharge time) and a variation of the frequency response function in the sensor vibration system in the second embodiment of the invention.

FIG. 16 shows a waveform of the applied voltage (in the discharge time) in a frequency domain (FIG. 9(b)) and a variation of the frequency response function in the sensor vibration system, as in FIG. 11(a). There is, however, a distinct difference from the graph of FIG. 11(a). The graph of FIG. 11(a) shows the plot of the intermediate value in the frequency direction between the value when the residual quantity of ink is 'not less than the preset level' and the value when the residual quantity of ink is 'less than the preset level', as the frequency response function in the sensor vibration system. The graph of FIG. 16 shows, on the other hand, plots of the frequency response function in the sensor vibration system separately when the residual quantity of ink is 'less than the preset level' (solid line curve) and when the residual quantity of ink is 'not less than the preset level' (dotted line curve).

In the graph of FIG. 16, two input/output ratios T1 and T2 represent variations in Transfer Function of the sensor structure at a fundamental frequency of vibration due to discharge of the piezoelectric element PZT. The input/output ratio T1 shows a variation in Transfer Function when the residual quantity of ink is less than the preset level, whereas the input/output ratio T2 shows a variation in Transfer Function when the residual quantity of ink is not less than the preset level. The procedure of this embodiment sets the discharge characteristic (fundamental frequency) of the piezoelectric element PZT to have a large rate of the input/output ratio T1/T2. A relatively large voltage waveform accordingly arises only when the residual quantity of ink is less than the preset level.

Figure 17:
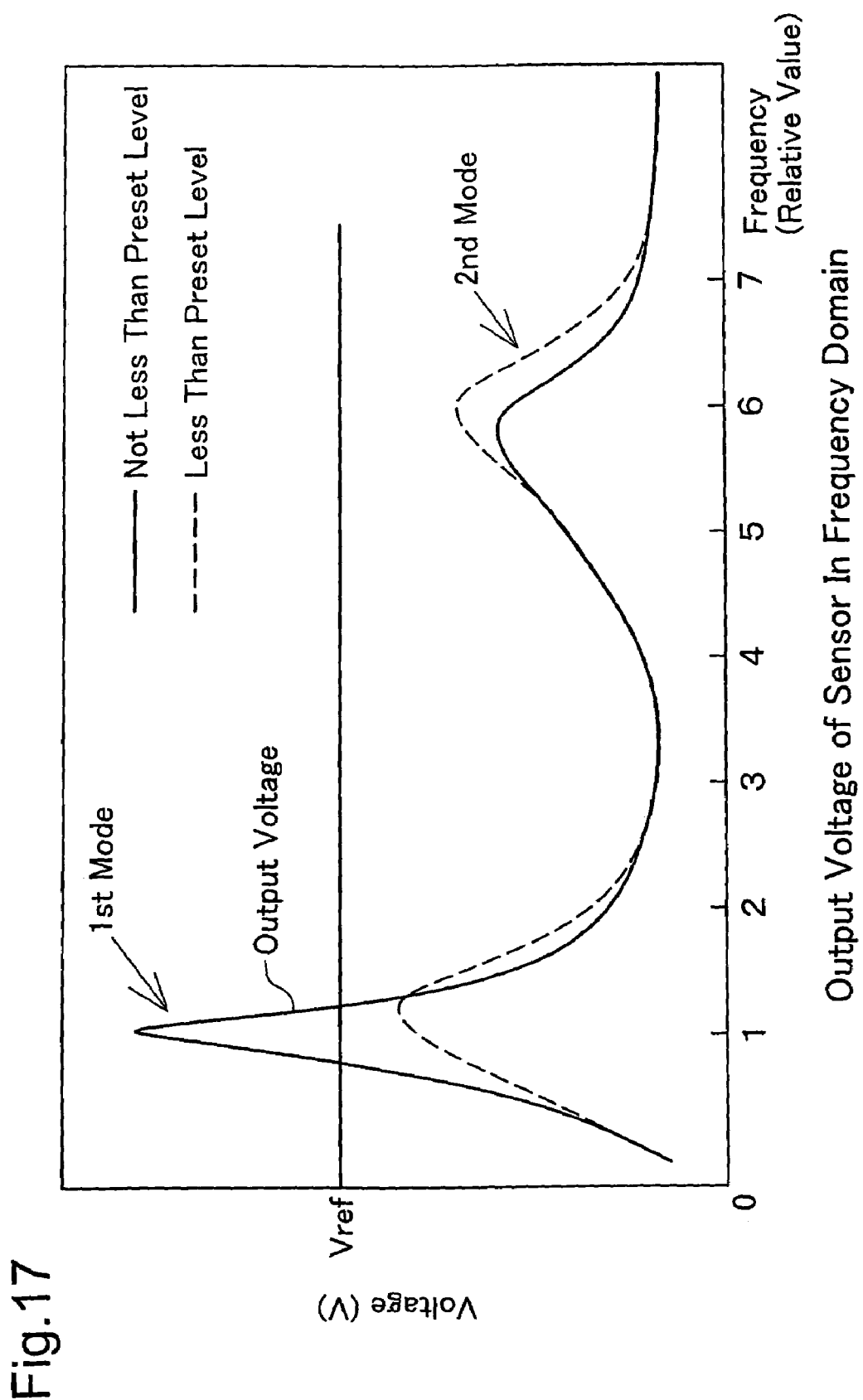
FIG. 17 shows variations in output voltage of the piezoelectric element PZT in the second embodiment of the invention.

FIG. 17 shows variations in output voltage of the piezoelectric element PZT in the second embodiment of the invention. A solid line curve represents a variation in output voltage of the piezoelectric element PZT when the residual quantity of ink is less than the preset level. A dotted line curve represents a variation in output voltage of the piezoelectric element PZT when the residual quantity of ink is not less than the preset level.

The reference potential Vref is set as the reference voltage for residual quantity detection. As clearly understood from the graph of FIG. 17, the reference voltage for residual quantity detection is set to be smaller than the maximum output voltage of the piezoelectric element PZT when the residual quantity of ink is less than the preset level but to be greater than the output voltage of the piezoelectric element PZT when the residual quantity of ink is not less than the preset level. Such setting is attained by adequately preparing the table of the second embodiment (see FIG. 15).

The process then carries out the charge (step S110), the discharge (step S120), and the standby (step S130), in the same manner as the first embodiment.

At step S140a, the controller 210 (FIG. 5) outputs the counter starting signal CI to the counter controller 236 for a predetermined time period. The counter controller 236 receives the counter starting signal CI and outputs the count control signal CC to the counter 238. The counter 238 counts the number of pulses output from the comparator 234, only while receiving the count control signal CC.

At step S150a, the counter 238 outputs the counted number of pulses, which is set to the printer 20. The printer 20 determines whether the residual quantity of ink is not less than the preset level according to the received number of pulses (step S160a). When the number of pulses is equal to '1' or greater, it is determined that the residual quantity of ink is less than the preset level (step S170). When the number of pulses is equal to '0', on the other hand, it is determined that the residual quantity of ink is not less than the preset level (step S180).

The procedure of the second embodiment detects the residual quantity of ink, based on the determination of whether the output voltage wave of the piezoelectric element after the discharge has a portion greater than the preset reference voltage for residual quantity detection. This reference voltage is variable. Adequate setting of the reference voltage advantageously ensures easy measurement of the residual quantity of ink.

In the structure of the second embodiment, the discharge characteristic of the piezoelectric element PZT is set to generate a relatively large voltage wave only when the residual quantity of ink is less than the preset level. One possible modification may set the discharge characteristic of the piezoelectric element PZT to generate a relatively large voltage wave only when the residual quantity of ink is not less than the preset level.

G. Modifications

The embodiments discussed above are to be considered in all aspects as illustrative and not restrictive. There may be many modifications, changes, and alterations without departing from the scope or spirit of the main characteristics of the present invention. Some examples of possible modification are given below.

G-1. The piezoelectric element PZT used as the sensor element in the above embodiments may be replaced by Rochelle salt (potassium sodium tartrate). The sensor used in this invention is to take advantage of a piezoelectric element having two characteristics, that is, inverse piezoelectric effect of deformation by charge or discharge and piezoelectric effect of generation of voltage due to deformation.

G-2. The procedure of the embodiment regulates the ON-time of the transistor Tr2 and the discharge time constant defined by the piezoelectric element and the discharge time constant adjustment resistance to change the discharge characteristics. The regulation may be restricted to only either of the ON-time and the resistance.

G-3. The procedure of the embodiment regulates the discharge time constant by varying the resistance in the discharge time constant adjustment resistive circuit. One possible modification may vary a capacitance of the piezoelectric element connected in series with a capacitor to regulate the discharge time constant.

G-4. In the above embodiments, the subject of measurement of the residual quantity is ink. Another possible subject of measurement is toner. In general, the subject of measurement of the residual quantity in the invention may be any expendable that decreases in quantity with use of a device.

G-5. The procedure of the embodiment sets the discharge characteristics of the piezoelectric element and the reference voltage according to the preset table that maps the sensor rank to the setting of the discharge time constant adjustment resistive circuit Rs or the reference voltages. One possible modification may measure the characteristic of the piezoelectric element as a characteristic value representing the relation between the voltage and the distortion and set the discharge characteristics and the reference voltage corresponding to the result of the measurement according to an algorithm stored in a non-volatile memory or in a computer.

The algorithm may be set to calculate optimum values of the discharge characteristics, for example, the discharge time constant and the discharge time, from the characteristic value according to specified computational expressions and select the settings closest to the optimum values. The required process of the invention sets the discharge characteristics and the reference voltage according to piezoelectric element characteristic information representing the characteristics of the piezoelectric element. Another applicable method may change the settings by trial and error to attain the adequate result of measurement.

G-6. The procedure of the above embodiment generates a detection signal, based on the result of determination of whether the output voltage of the piezoelectric element after the discharge has a portion greater than the preset reference voltage for residual quantity detection. One possible modification may generate a detection signal, based on the result of determination of whether the number of peaks higher than the preset reference voltage for residual quantity detection is not less than a specified value (for example, 3). In general, the detection signal generation circuit of the invention is designed to generate a detection signal including information, which represents whether the amplitude of remaining vibration of the piezoelectric element after discharge is greater than a preset threshold value.

G-7. The procedure of the embodiment sets the discharge time constant of the piezoelectric element PZT to make the output voltage waveform of the piezoelectric element PZT have distinctively different amplitudes when the residual quantity of ink is not less than the preset level and when the residual quantity of ink is less than the preset level. One possible modification may use the sensor SS having distinctively different amplitudes of the waveform (FIG. 9(b)) of the applied voltage (in the discharge time) in the frequency domain when the residual quantity of ink is not less than the preset level and when the residual quantity of ink is less than the preset level.

When part or all of the functions of the invention are attained by the software configuration, the software (computer programs) may be stored in computer-readable recording media. The terminology 'computer-readable recording media' in this invention is not restricted to portable recording media, such as flexible disks and CD-ROMs, but also includes internal storage devices of the computer like diverse RAMs and ROMs, as well as external storage devices connected to the computer, such as hard disk units.

INDUSTRIAL APPLICABILITY

The technique of the present invention is applicable to expendable containers used for output devices of the computer.

The invention claimed is:

1. An expendable container capable of measuring a residual quantity of stored expendable, the expendable container comprising:
an expendable tank configured to store the expendable and has a piezoelectric element attached thereto;
a detection signal generation circuit configured to charge and discharge the piezoelectric element, and generate a detection signal including cycle information, the cycle information representing a cycle of an output voltage wave of the piezoelectric element after the discharge; and
a control module configured to control the charge and the discharge of the piezoelectric element by the detection signal generation circuit, wherein
the detection signal generation circuit comprises:
a comparator configured to compare a voltage of the output voltage wave with a reference voltage for residual quantity detection, and generate a pulse according to a result of the comparison; and
a signal generator configured to generate the detection signal in response to the generated pulse, wherein
the control module is capable of varying the reference voltage for residual quantity detection,
the expendable container further comprising:
a non-volatile memory configured to store setting information on the reference voltage for residual quantity detection, the setting information on the reference voltage for residual quantity detection representing a relation between the reference voltage for residual quantity detection and piezoelectric element characteristic information indicative of a characteristic of the piezoelectric element,
wherein the control module is capable of setting the reference voltage for residual quantity detection according to a given piece of the piezoelectric element characteristic information and the setting information on the reference voltage for residual quantity detection.

2. The expendable container in accordance with claim 1, wherein
the piezoelectric element characteristic information is a rank selected among multiple ranks according to a measurement of the characteristic of the piezoelectric element, and
the control module is configured to set the reference voltage for residual quantity detection in response to the selected rank.

3. An expendable container capable of measuring a residual quantity of stored expendable, the expendable container comprising:
an expendable tank configured to store the expendable and has a piezoelectric element attached thereto;
a detection signal generation circuit configured to charge and discharge the piezoelectric element, and generate a detection signal including cycle information, the cycle information representing a cycle of an output voltage wave of the piezoelectric element after the discharge; and
a control module configured to control the charge and the discharge of the piezoelectric element by the detection signal generation circuit, wherein
the detection signal generation circuit comprises:
a comparator configured to compare a voltage of the output voltage wave with a reference voltage for residual quantity detection, and generate a pulse according to a result of the comparison; and
a signal generator configured to generate the detection signal in response to the generated pulse, wherein
the control module is capable of varying the reference voltage for residual quantity detection, wherein
the control module controls has a test mode to control the detection signal generation circuit to measure an output voltage of the piezoelectric element after a preset time period has elapsed since a last charge or discharge operation of the piezoelectric element, and also to control the detection signal generation circuit to generate a failure detection signal according to a presence or absence of a specific peak where an output voltage wave of the piezoelectric element is higher than a reference voltage for function check.

4. The expendable container in accordance with claim 3, the expendable container further comprising:
a non-volatile memory configured to store setting information on the reference voltage for function check, the setting information on the reference voltage for function check representing a relation between the reference voltage for function check and piezoelectric element characteristic information indicative of a characteristic of the piezoelectric element, wherein the control module is capable of setting the reference voltage for function check according to a given piece of the piezoelectric element characteristic information and the setting information on the reference voltage for function check.

5. The expendable container in accordance with claim 4, wherein the piezoelectric element characteristic information is a rank selected among multiple ranks according to a measurement of a characteristic of the piezoelectric element, and the control module is configured to set the reference voltage for function check in response to the selected rank.

6. A computer-readable recording medium, the medium storing a computer program for causing a computer to control an expendable container to set a reference voltage for measuring a residual quantity of stored expendable, the expendable container being capable of the measuring, wherein the expendable container comprising:

an expendable tank configured to store the expendable and has a piezoelectric element attached thereto;

a detection signal generation circuit configured to charge and discharge the piezoelectric element and generate a detection signal including cycle information, cycle information representing a cycle of an output voltage wave of the piezoelectric element after the discharge;

a control module configured to control the charge and the discharge of the piezoelectric element; and a non-volatile memory configured to store setting information and residual quantity information, the setting information representing a current setting of the reference voltage for residual quantity detection, the residual quantity information representing whether the residual quantity of the expendable is greater than a preset level, the computer program for causing the computer to carry out the functions of:

(a) reading out the setting information and the residual quantity information from the non-volatile memory;

(b) setting the reference voltage for residual quantity detection, based on the setting information;

(c) confirming that the residual quantity of the expendable is greater than the preset level, based on the residual quantity information;

(d) generating a detection signal including information representing a cycle of a remaining vibration of the piezoelectric element after the discharge, in response to the confirmation;

(e) receiving the detection signal, and determining whether the residual quantity of the expendable is measurable, in response to the received detection signal;

(f) setting a different voltage from the current setting to the reference voltage for residual quantity detection, and returning a process to the function (d), in response to the determination that the residual quantity of the expendable is immeasurable; and (g) recording the setting information representing the current setting of the reference voltage for residual quantity detection into the non-volatile memory, in response to the determination that the residual quantity of the expendable is measurable.

* * * * *

UNITED STATES PATENT AND TRADEMARK OFFICE
CERTIFICATE OF CORRECTION

PATENT NO. : 7,280,928 B2  Page 1 of 1
APPLICATION NO. : 10/518528
DATED : October 9, 2007
INVENTOR(S) : Yuichi Nishihara It is certified that error appears in the above-identified patent and that said Letters Patent is hereby corrected as shown below:

ON THE COVER PAGE, ADD THE FOLLOW FIELDS:

--(73) Assignee: Seiko Epson Corporation, Tokyo (JP)--; and

--(74) Attorney, Agent, or Firm - Stroock & Stroock & Lavan LLP--.

Signed and Sealed this

Sixth Day of May, 2008

JON W. DUDAS
*Director of the United States Patent and Trademark Office*